J. B. L. BARTLETT.
HORSE RAKE TOOTH.

117243  PATENTED JUL 25 1871

Witnesses.
Villette Anderson.
D. D. Kane

Inventor.
J. B. L. Bartlett,
Chipman Hosmer & Co
Attys.

UNITED STATES PATENT OFFICE.

JONATHAN B. L. BARTLETT, OF NORTH JAY, MAINE.

IMPROVEMENT IN HORSE-RAKE TEETH.

Specification forming part of Letters Patent No. 117,243, dated July 25, 1871.

*To all whom it may concern:*

Be it known that I, JONATHAN B. L. BARTLETT, of North Jay, in the county of Franklin and State of Maine, have invented a new and valuable Improvement in Horse-Rake Teeth; and I do hereby declare that the following is a full, clear, and exact description of the construction and operation of the same, reference being had to the annexed drawing making a part of this specification, and to the letters and figures of reference marked thereon.

Figure 1:
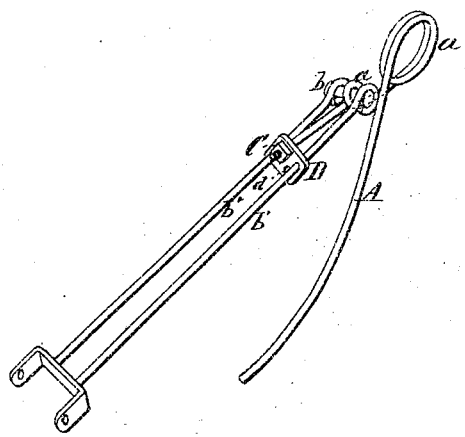
Figure 2:

Figure 1 of the drawing is a perspective view of my invention. Fig. 2 is a face view of adjusting-plate.

This invention has relation to an improvement in the method of adjusting horse-rake teeth.

In the accompanying drawing illustrating this invention, A designates an inwardly-curved horse-rake tooth, formed with a spring-coil, $a$, at its head to give it elasticity, and with an eye, $a'$, for the purpose of hanging it on a transverse pin, $b$, which connects the rear ends of two horizontal arms or rods, $b'$, extending from the axle or cross-bar, to which they are secured, toward the rear end of the rake. The upper part of the tooth extends forward beyond the eye $a'$, and passes through one or the other of the holes $d$ made in the plate D, which is held by and is capable of being moved along the rods $b'$. A screw-thread is formed on the end of the tooth-head for receiving a nut, C, which is placed on it to keep it in position.

The tooth is adapted to rough hard ground or stout hay, by elevating its upper end and placing the top hole of the plate D over it, securing the two together by the nut C. In this position the lower part of the tooth projects forward in such a manner that the ground presents but little interference to the progress of the machine, and is not liable to break the tooth. When the ground is soft or even the end of the tooth may be changed to the lower hole of the plate D and the tooth thrown back.

What I claim as my invention, and desire to secure by Letters Patent, is—

The perforated plate D, in combination with the rods $b'$ and tooth A, constructed and arranged substantially as and for the purpose specified.

In testimony that I claim the above I have hereunto subscribed my name in the presence of two witnesses.

J. B. L. BARTLETT.

Witnesses:
GUSTAVUS KYES,
E. L. KYES.